(12) United States Patent
Kwon et al.

(10) Patent No.: US 6,667,987 B1
(45) Date of Patent: Dec. 23, 2003

(54) METHOD OF EXTENDING CHANNELS FOR IEEE-1394 SERIAL BUS

(75) Inventors: Min-jee Kwon, Suwon (KR); Sung-il Kang, Seo-gu (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/418,442

(22) Filed: Oct. 15, 1999

(30) Foreign Application Priority Data

Oct. 15, 1998 (KR) ............................................. 98-43163

(51) Int. Cl.[7] .................................................. H04J 3/16
(52) U.S. Cl. ........................................ 370/437; 370/458
(58) Field of Search ................................ 370/458, 459, 370/437, 438, 410, 522

(56) References Cited

FOREIGN PATENT DOCUMENTS

| EP | 0 921 472 A2 | 6/1999 | |
|----|--------------|--------|---|
| JP | 9-93250 | 4/1997 | |
| JP | 11-177589 | 7/1999 | ............ H04L/12/40 |
| JP | 11-187048 | 7/1999 | |
| JP | 11-261606 | 9/1999 | |
| WO | WO 97/38513 | 10/1997 | |

*Primary Examiner*—Chau Nguyen
*Assistant Examiner*—Keith M. George
(74) *Attorney, Agent, or Firm*—Sughrue Mion, PLLC

(57) ABSTRACT

A method of extending channels for the IEEE 1394 serial bus is provided. The method for extending channels of the IEEE 1394 serial bus in a channel assignment through an isochronous resource manager (IRM) of an IEEE 1394 node, wherein the node includes a CP register for physical channels and a CE register for extended channels which have the same format as the format of a CA register which holds information on channels assigned by the IRM, includes: checking whether all the channels of the IRM are used and there is available bandwidth; setting the value obtained by adding 64 to the value of the CP register, to the CE register when all the channels are used and there is available bandwidth; and generating a packet by setting a tag field value of a packet as a predetermined value when the value is set to the CE register. According to the present invention, it is possible to solve the shortage of the channels which can occur as the bandwidth increases. Namely, it is possible to prevent the incomplete use of bandwidth due to the restriction of the number of channels by increasing the 64 channels to up to 256 channels.

4 Claims, 7 Drawing Sheets

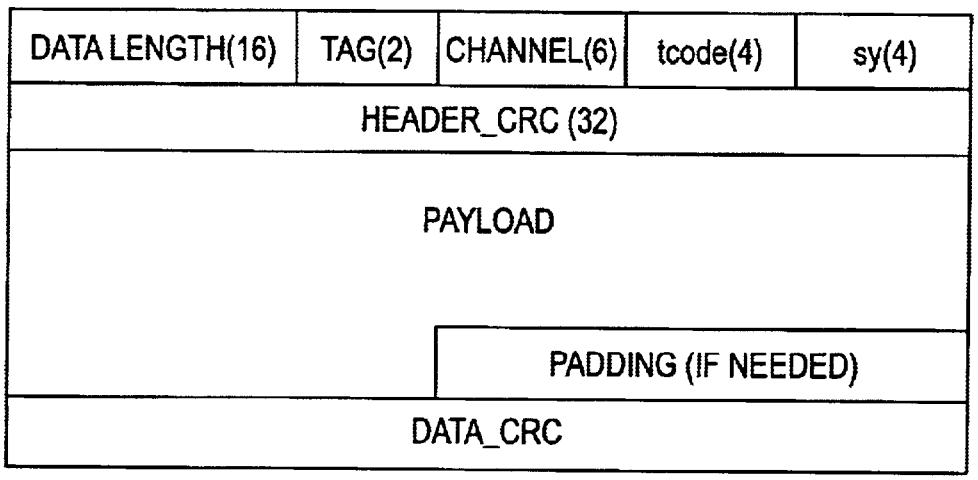

METHOD OF EXTENDING CHANNELS FOR IEEE-1394 SERIAL BUS

BACKGROUND OF THE INVENTION

1. Field of the Invention

The present invention relates to data transmission using the IEEE 1394 serial bus, and more particularly, to a method of extending channels for the IEEE 1394 serial bus.

2. Description of the Related Art

The IEEE 1394 serial bus, by which it is possible to transmit data at a high speed, enables real time data transmission for multimedia applications. The IEEE 1394 serial bus provides an asynchronous service, an isochronous stream service, and an asynchronous stream service.

When isochronous stream transmission and asynchronous stream transmission is performed on the IEEE 1394 serial bus, data is transmitted by using channels. FIG. 1 shows the format of both an IEEE 1394 isochronous data packet or an asynchronous stream packet. Numbers in parentheses denote bit numbers. The IEEE 1394 isochronous packet and asynchronous stream packet consist of two quadlet headers, each of which comprise 32 bits as shown in FIG. 1, payload data of no more than the maximum payload size shown in Table 1, and CRC data. Since a channel field in the packet header shown in FIG. 1, which indicates a channel number, is comprised of six bits, the channel field can indicate up to 64 different channels. A binary value 00 is used as a two bit tag field for an upper level process and other values are reserved.

TABLE 1

| Transmission Speed | Data Rate | | Asynchronous payload size | | Isochronous payload size | |
|---|---|---|---|---|---|---|
| S100 | 98.304 | Mbps | 512 | Bytes | 1,024 | Bytes |
| S200 | 186.608 | Mbps | 1,024 | Bytes | 2,048 | Bytes |
| S400 | 303.216 | Mbps | 2,048 | Bytes | 4,096 | Bytes |
| S800 | 786.43 | Mbps | 4,096 | Bytes | 8,192 | Bytes |
| S1600 | 1,572.9 | Mbps | 8,192 | Bytes | 16,384 | Bytes |
| S3200 | 3,145.7 | Mbps | 16,384 | Bytes | 32,768 | Bytes |

These channels, the number of which is restricted to 64, can be used in two situations. In the first situation, the channels are used as isochronous channels for multimedia data transmission in which transmission time is important. In the second situation, the channels are used as asynchronous channels for transmitting a lot of data in the form of a stream, where the stability of data is more important than the transmission time. Transmission using asynchronous channels is a newly added transmission function in the P1394a complementary standard. Both bandwidth and channel are assigned for the isochronous transmission. Bandwidth is not assigned for the asynchronous transmission of data, but channels are allocated. Asynchronous stream transmission is performed during the asynchronous transmission phase of an isochronous cycle. Meanwhile, since the total number of channels is restricted to 64, when many channels are used for an asynchronous stream transmission, the number of channels which can be used for the isochronous transmission is reduced.

FIG. 2 shows two different formats of the CHANNELS_AVAILABLE(CA) register which is included in the isochronous resource manager (IRM) of the IEEE 1394 serial bus. The channels are managed as follows in the conventional IEEE 1394 serial bus. The value of the CHANNELS_AVAILABLE(CA) register of the IRM is read to determine whether or not available channels exist. If available channels exist, the channels are assigned by performing a lock transaction using the numbers of available channels as arguments.

The isochronous transmission is performed using the assigned channels. However, since the channel field, which indicates the assigned channel numbers, comprises 6 bits, only 64 channels can be shown.

FIG. 3 describes the channel management using the CHANNELS_AVAILABLE(CA) register of the IRM in more detail. When initialization is performed by one node, all values of the CA register are set to 1. Namely, the two parts of the CA register, which are CHANNEL_AVAILABLE_HI part and CHANNEL_AVAILABLE_LO part are set to 'FFFF' as a hexadecimal value, respectively. Other nodes check whether there are available channels by performing a read transaction. If an available channel exists, the corresponding node performs a lock transaction using the number of the available channel, thereby the node sets corresponding bits of the CA register for the IRM. Thus, the bits of the CA corresponding to the channels used by the lock transaction are set to 0.

The used lock transaction has two parameters: argument and data. Namely, the lock transaction is expressed as lock(arg, data) which is a function. The argument parameter is the value of the register read by the read transaction. The data parameter is the number of the channel to be assigned. The IRM compares the value of the argument with the value existing in the register. If the value of the argument is the same as the value of the register, the value of the register is changed to the data value and the previous register value is sent to the node which requested the channels.

Meanwhile, when the bandwidth of the initial IEEE 1394 serial bus is 100 Mbps, the average bandwidth which can be used by each channel is not significantly large, for example, 1 Mbps. Therefore, the number of channels does not restrict the band width. However, it is very likely that the entire bandwidth cannot be fully used by 64 channels since the average bandwidth which can be used by each channel is large, for example, no less than 10 Mbps when the supported bandwidth is in the order of Gbps and the channels are used for asynchronous stream transmission. Namely, since the total number of channels is restricted to 64, when many channels are used for asynchronous stream transmission, the number of channels which can be used for isochronous transmission is reduced. Also, all of the 64 channels may be exhausted even though available bandwidth remains.

Although the channels of the IRM are extended, the extended channels cannot be used since only 64 channels can be expressed by an isochronous packet.

SUMMARY OF THE INVENTION

To solve the above problem, it is an object of the present invention to provide a method of extending the total number of channels of the IEEE 1394 serial bus by which it is possible to supply the shortage of 64 IEEE 1394 channels which can occur at a bandwidth in the Giga bps order when an IEEE 1394 software developer creates an application program using a channel-based data transmission function.

It is another object of the present invention to provide a method for canceling channels extended by a predetermined channel assignment through an IRM of an IEEE 1394 node according to the channel extending method.

Accordingly, to achieve the first object, there is provided a method for extending channels of the IEEE 1394 serial bus in a channel assignment through an isochronous resource manager (IRM) of an IEEE 1394 node, comprising the steps of letting the IEEE 1394 node include a CP register for physical channels and a CE register for extended channels which have the same format as the format of a CA register which holds information on channels assigned by the IRM, checking whether all the channels of the IRM are used and there is available bandwidth, setting the value obtained by adding 64 to the value of the CP register in order to obtain the value of the CE register when all the channels are used and there is available bandwidth, and generating a packet by setting a tag field value of a packet as a predetermined value where the value is set to the CE register.

The method for extending channels of the IEEE 1394 serial bus preferably further comprises extending channels by setting the tag field value of the packet as another reserved value and repeating the above processes when there are no channels which can be assigned in the CE register.

To achieve the second object, there is provided a method of canceling channels extended by a predetermined channel assignment through an IRM of an IEEE 1394 node, wherein the node comprises a CP register for physical channels and a CE register for extended channels which have the same format as the format of a CA register which shows information on channels assigned by the IRM, comprising: checking whether a channel number to be canceled corresponds to an extended channel; setting the corresponding bit of the CE register to be not in use when the channel number corresponds to the extended channel; checking whether the corresponding bit of the CP register is indicated to be in use; and canceling the corresponding channel of the IRM when the corresponding bit of the CP register is indicated to be not in use.

The method of canceling channels extended by a predetermined channel assignment through an IRM of an IEEE 1394 node preferably further comprises: checking whether the corresponding bit of the CE register is indicated to be in use when the channel number to be canceled does not correspond to an extended channel; setting only the corresponding bit of the CP register to be not in use when the corresponding bit of the CE register is indicated to be not in use; and canceling the corresponding channel of the IRM when the corresponding bit of the CE register is indicated to be in use.

BRIEF DESCRIPTION OF THE DRAWING(S)

The above objects and advantages of the present invention will become more apparent by describing in detail a preferred embodiment thereof with reference to the attached drawings in which:

FIG. 1 shows the format of both an IEEE 1394 isochronous data block packet or an asynchronous stream packet;

FIG. 2 shows the format of the CHANNELS_AVAILABLE(CA) register which is included in the isochronous resource manager of the IEEE 1394 serial bus;

DESCRIPTION OF THE PREFERRED EMBODIMENTS

Figure 3:
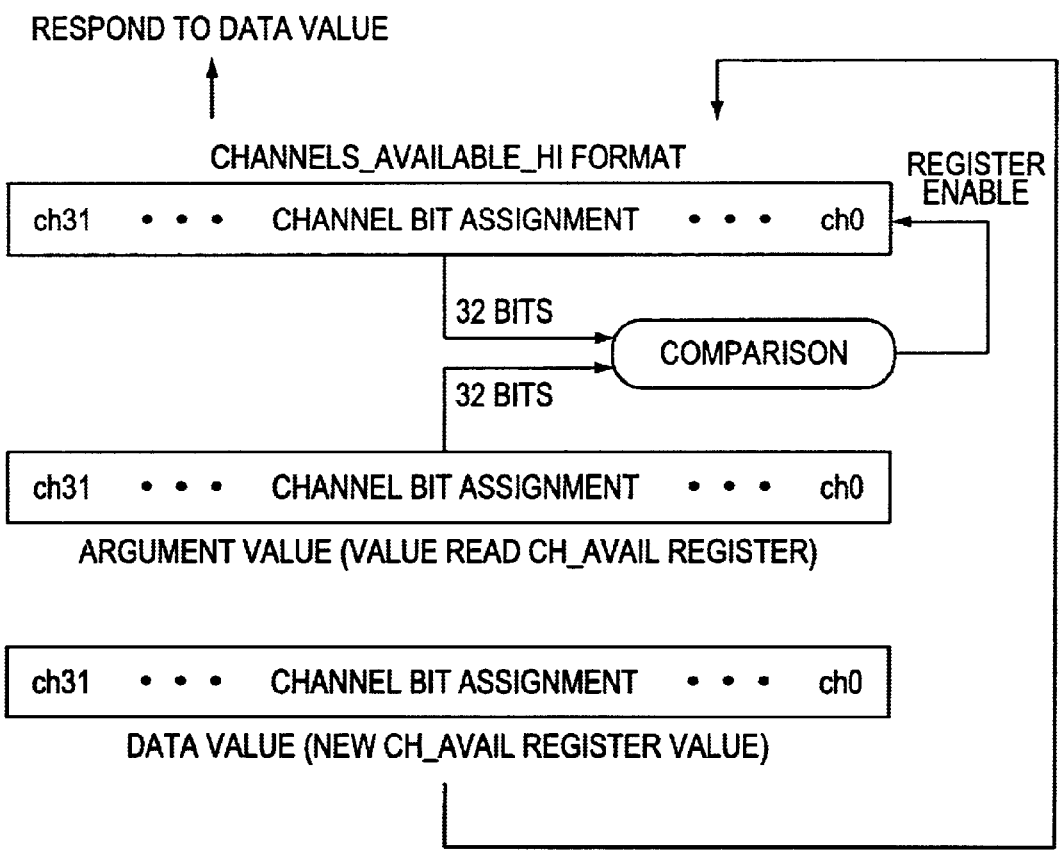
FIG. 3 is a view for describing channel management using the CHANNELS_AVAILABLE(CA) register of the IRM in more detail.
Figure 4:
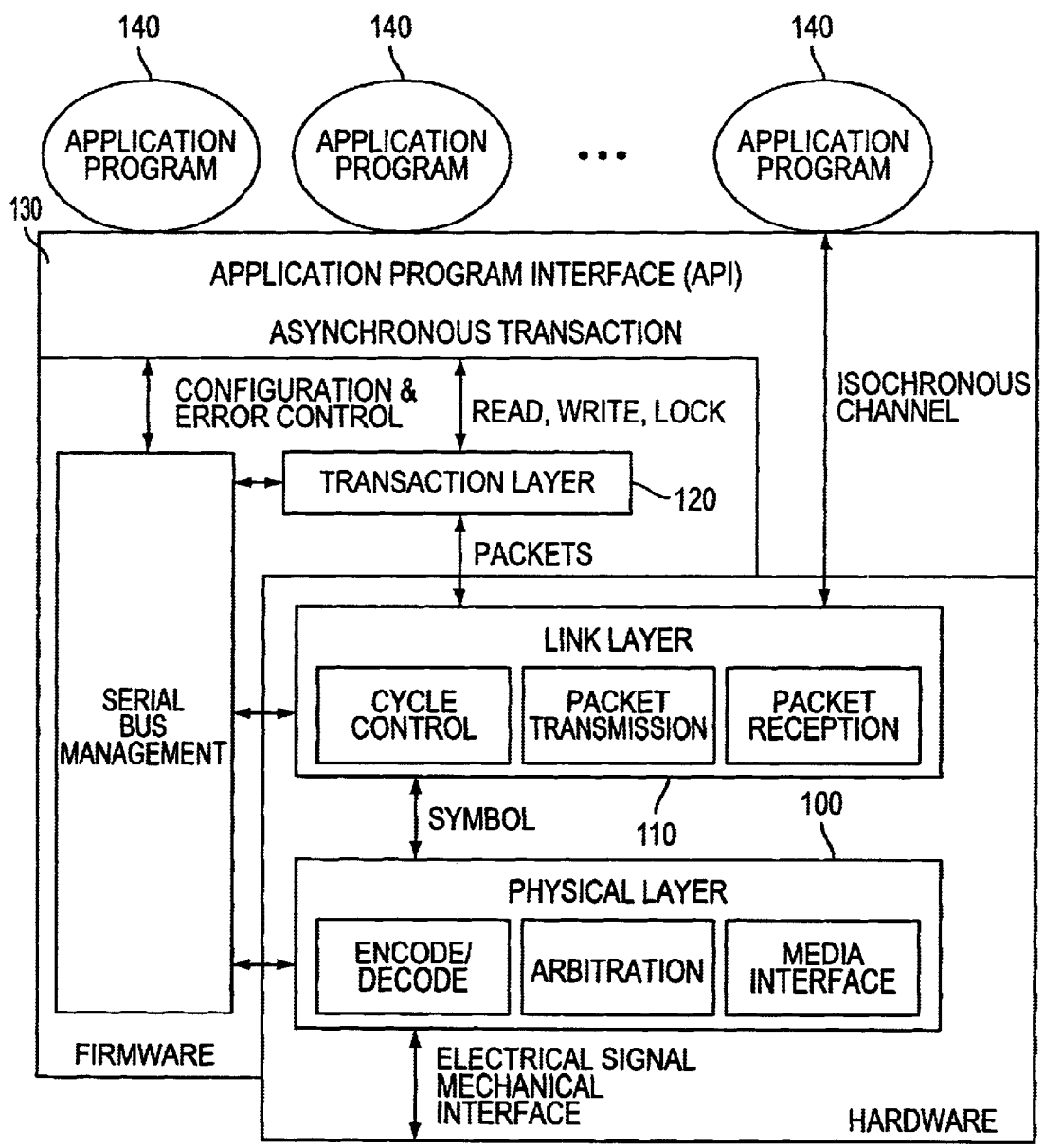
FIG. 4 shows an entire transmission flow among a general protocol stack which IEEE 1394 nodes have, an application program, and an application program interface, to which the present invention is applied.

Hereinafter, the present invention will be described in detail with reference to the attached drawings. FIG. 4 shows an entire transmission flow including a general protocol stack of an IEEE 1394 node, an application program, and an application program interface, to which the present invention is applied. A physical layer 100, which is the lowest layer, receives a bit stream from a link layer 110, which is an upper layer, during transmission and acquires the right to use a serial bus. Then, the physical layer 100 encodes the bit stream, converts the bit stream into an electrical signal, and transmits data to the bus. During reception, the processes performed during transmission are performed in reverse. The link layer 110, which manages data in units of packets, forms or disintegrates a packet, detects errors, and manages a bus cycle. A transaction layer 120 provides transactions such as read, write, and lock, and performs asynchronous communication with other nodes on the 1394 bus using the service provided by lower layers. An application program interface (API) 130 provides an interface between application programs 140 and protocol stacks, which is required for data transmission through an asynchronous transaction or an isochronous channel.

Figure 5:
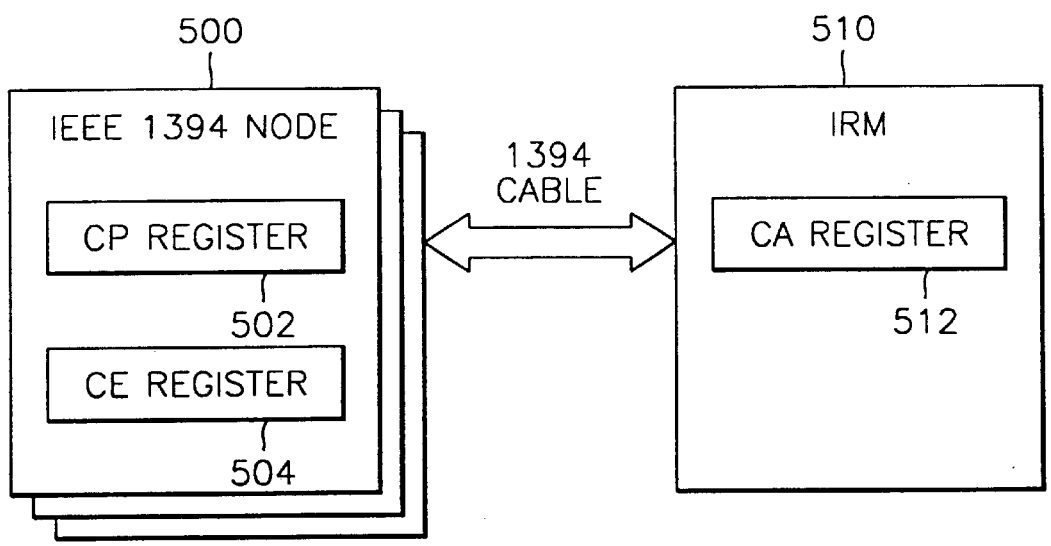
FIG. 5 shows a connection between a node having at least one application program which requests data transceiving and the IRM which manages channels and bandwidth, and an inner register for extending the total number of channels of the node and the IRM, to which the present invention is applied.

FIG. 5 shows a connection between a node 500 having at least one application program which requests data transceiving, and the IRM which manages channels and bandwidth, and an inner register for extending the total number of channels of the node and the IRM, to which the present invention is applied. As shown in FIG. 5, each node connected to the IEEE 1394 serial bus includes two registers which have the same format as the format of a CHANNELS_AVAILABLE(CA) register 512, that is, a CHANNELS_PHYSICAL(CP) register 502 and a CHANNELS_EXTENSION(CE) register 504, in order to record the use of channel numbers. CP register 502 indicates whether or not physical channels are used. CE register 512 indicates whether or not extended channels are used.

The method of extending channels according to the present invention includes a process of assigning channels and a process of canceling assigned channels. The assignment of channels and the cancellation of the assigned channels will be described as follows. If there are channels assigned by the IRM 510, that is, the physical channels, a corresponding node 500 makes an extended channel whose number is larger than 63 by using the physical channels. This method is used when channels are requested in a state where there are no available physical channels but there is available bandwidth. In this situation, when a channel is requested by a channel client which wants to use the channels, for example, the application program, a device driver adds 64 to one of the assigned physical channels and provides the result to the channel client as an extended channel number and maintains the connection between the two channels. This is performed by setting the channel bit of the register, which manages the extended channels, as being used. Since the extended channel number is determined based on the physical channel in the node, conflict due to the same channel number does not occur. Therefore, the assigned channel numbers do not overlap even though the channel numbers are not assigned by the IRM. The bandwidth is assigned to the extended channels by the same method as the method by which the bandwidth is assigned to the physical channels.

Since the channel numbers inserted into the headers of the isochronous stream packet and the asynchronous stream packet, each of which is formed of six bits, can show only 64 channels, the extended channel numbers are shown using the values which are not used in a tag field. Therefore, the channel number x in which a tag is set is 64+x.

If the connected physical channels are requested to be canceled while the extended channels are being used, an apparatus driver sets the corresponding bit of the CP register to 0 without canceling the physical channels and lets the extended channels be used continuously. The device driver cancels the corresponding physical channel through the CA register of the IRM only when the extended channels and the physical channels are canceled by the application program, namely, when the corresponding bits of both the CP register and the CE register are set to 0. The bandwidth is canceled from the extended channels in the same method as the method by which the bandwidth is canceled from the physical channels.

Figure 6:
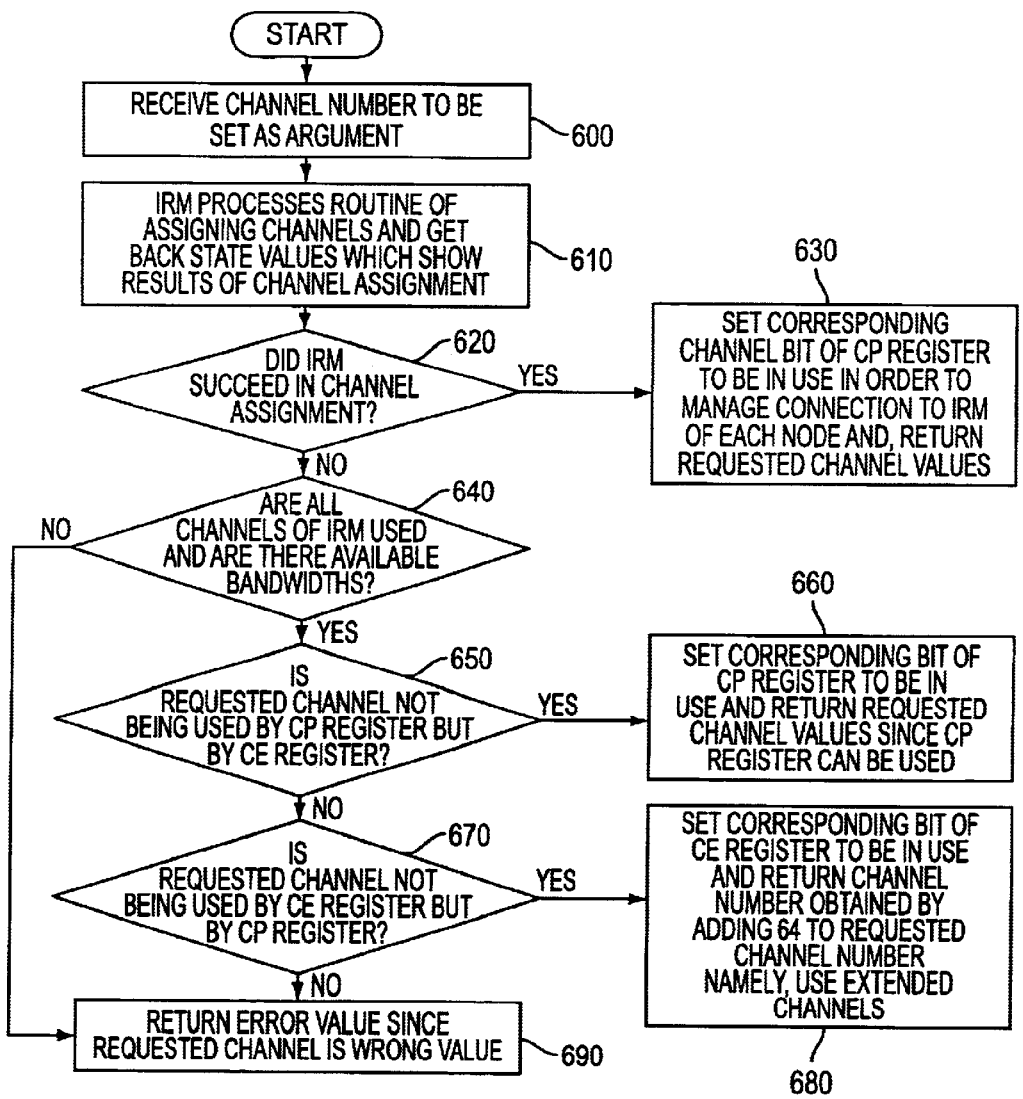
FIG. 6 is a flowchart describing a method of assigning channels according to the present invention.

FIG. 6 is a flowchart that describes the method of assigning the channels. The method of assigning the channels will be described in more detail with reference to FIG. 6. When the application program of node 500 makes a request to IRM 510 for channels, IRM 510 receives the channel numbers to be set as arguments (step 600). IRM 510 processes a routine for assigning the channels with reference to the arguments, and returns state values which show the results of the channel assignment to node 500 (step 610). Node 500 checks whether IRM 510 succeeded in the channel assignment through the returned state values (step 620). When IRM 510 succeeds in the channel assignment, the corresponding bit of CP register 502 of node 500 is set to be in use in order to manage the connection of each node to the IRM and the requested channel values are returned to the application program (step 630).

Namely, since the channel assignment is successfully performed by IRM 510 in steps 610 through 630, the only thing to be done is to set the corresponding bit of CP register 502 so that the information of register 512 of IRM 510 coincides with the information of CP register 502 of node 500.

When the channel assignment is not successfully performed in step 620, a determination is made as to whether all the channels of the IRM 510 are used, and there is available bandwidth (step 640). If there is available bandwidth even though all the channels are used, a determination is made as to whether the channel requested by node 500 is indicated to be not in use by the CP register but to be in use by the CE register (step 650). When the channel is indicated to be not in use by the CP register but to be in use by the CE register, since it is possible to use the CP register, the bit of the CP register corresponding to the channel is set to be in use and the requested channel value is returned (step 660). Namely, since the corresponding channel is indicated to be in use continuously by the IRM in steps 650 through 660, only the information of the corresponding bit of the CP register is changed and the channel number of the CP register is used as is.

Next, a determination is made as to whether the requested channel is indicated to be not in use by the CE register but to be in use by the CP register (step 670). If so, the corresponding bit of the CE register is set to be in use and the channel number obtained by adding 64 to the requested channel number is returned. Namely, the extended channels are used by the application program (step 680). If the requested channel is indicated to be in use by the CP register and the CE register, the requested channel is a wrong value, therefore, an error value is returned to the application program which requested the channel (step 690). If the channel assignment is not successful in step 620, the channel assignment can be re-tried before performing step 640.

Figure 7:
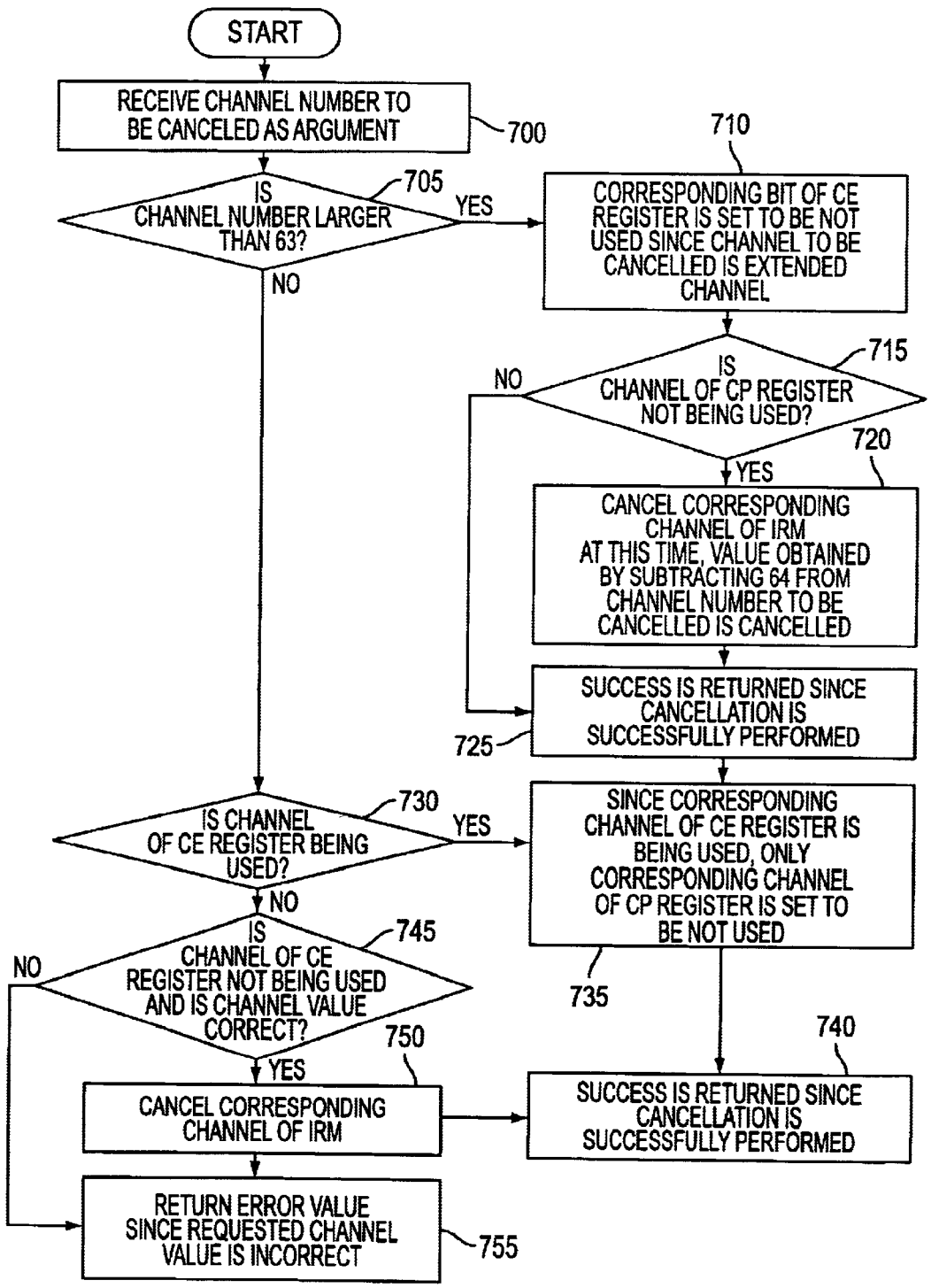
FIG. 7 is a flowchart describing a method of canceling the assigned channels according to the present invention.

FIG. 7 is a flowchart that describes the method of canceling the channels. The method of canceling the channels will be described in detail with reference to FIG. 7.

When the application program desires to cancel a channel of node 500, the channel number to be canceled is received as an argument (step 700). Then, a determination is made as to whether the channel number is larger than 63 (step 705). When the channel number is larger than 63, since the channel to be canceled is an extended channel, the corresponding bit of the CE register is set to be not in use (step 710). Then, a determination is made as to whether the corresponding bit of the CP register is indicated to be in use (step 715). When the corresponding bit of the CP register is indicated to be not in use, the corresponding channel of IRM 510 is canceled (step 720). At this time, the channel number obtained by subtracting 64 from the channel number requested to be canceled is canceled. Then, a success indication is returned (step 725). Meanwhile, when the channel of the CP register is being used in step 715, a success indication is returned without canceling the corresponding channel of the IRM.

When the number of the channel to be canceled is not larger than 63, a determination is made as to whether the corresponding bit of the CE register is indicated to be in use (step 730). If the corresponding bit of the CE register is indicated to be in use, the corresponding channel of the CE register is being used, only the bit corresponding to the channel of the CP register is set to be not in use (step 735). Then, since the cancellation is successfully performed, a success indication is returned (step 740). When the bit corresponding to the channel of the CE register is indicated to be not in use in step 730, a determination is made as to whether the requested channel number is a correct value (step 745). When the requested channel number is a correct value and the bit of the corresponding to the channel of the CE register is indicated to be not in use, the corresponding channel of the IRM is canceled (step 750). Then, a success indication is returned (step 740). When the requested channel number is incorrect, an error value is returned (step 755).

Figure 8:
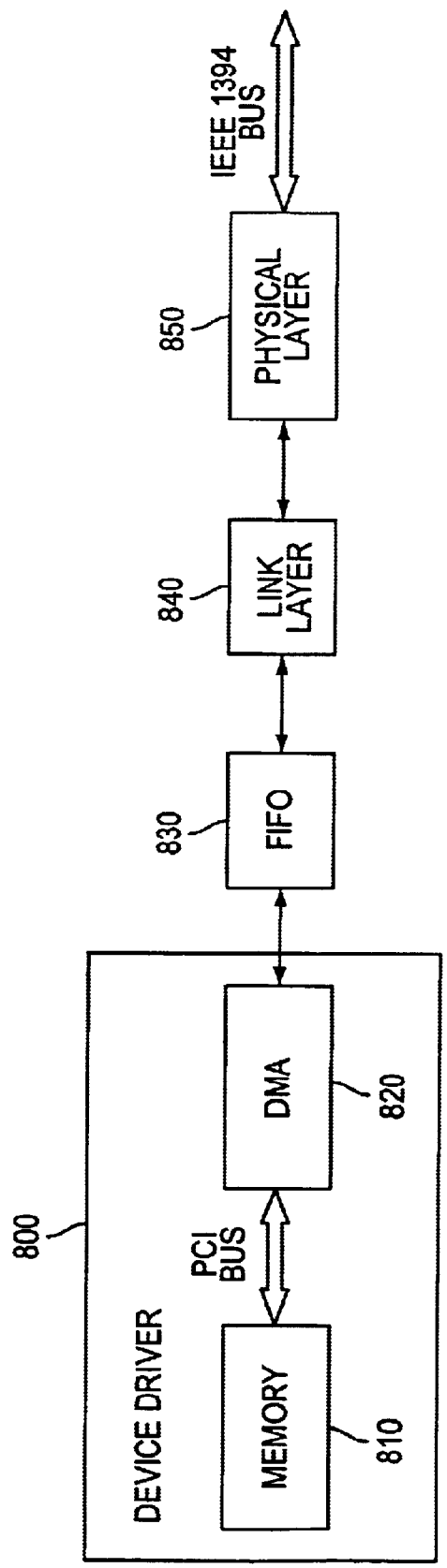
FIG. 8 shows the structure of general IEEE 1394 hardware.

FIG. 8 shows the structure of general IEEE 1394 hardware. The generation of a data packet when data is transmitted using the channel extended by the above-described channel extending method, will be described with reference to FIG. 8.

When data is transmitted through the assigned extended channel, a device driver 800 stores the extended channel numbers in the tag field and the channel field of the header of the packet before transmitting the packet to a FIFO 830 through a DMA 820. When reception of the extended channel is requested, the device driver 800 checks whether the corresponding physical channel is indicated to be assigned by the CA register and a transmission request is processed as an error when the corresponding physical channel is indicated to be not assigned in the CA register. When the corresponding physical channel is indicated to be assigned in the CA register, the extended channel is prepared to be processed on the basis of the physical channel. A determination is made as to whether the packet of the corresponding physical channel received by the FIFO 830 through a physical layer 850 and a link layer 840 corresponds to the extended channel or the physical channel by examining the tag field of the header of the packet of the corresponding physical channel. The packet is transmitted to the memory 810 using a corresponding channel of an additional direct memory address DMA channel.

If the number of channels is still insufficient in spite of each channel being extended once by the above method, it is possible to let each physical channel have three extended channels using three binary values, 01, 10, and 11 which are not used by the tag field. The number of related registers increases in proportion to the number of extended channels.

The above-mentioned present invention can be created as a program which can be executed by computers. Also, the present invention can be realized by a general purpose digital computer which operates the program from computer readable media. The media include a magnetic storage medium such as a ROM, a floppy disk, and a hard disk, an optical reading medium such as a CD-ROM and a DVD, and a carrier wave such as transmission through the Internet. The recording medium stores a program code which can execute the steps of letting the IEEE 1394 node include a CP register and a CE register which have the same format as the format of a CA register which shows information on channels assigned by the IRM, checking whether all the channels of the IRM are used and there is available bandwidth, setting the value obtained by adding 64 to the value of the CP register to the CE register when all the channels are used and there is available bandwidth, and generating a packet by setting a tag field value of a packet as a predetermined value when the value is set to the CE register, in a method for extending channels for the IEEE 1394 serial bus in a channel assignment through an isochronous resource manager (IRM) of an IEEE 1394 node, by computers.

Functional programs, codes, and code segments for realizing the present invention can be easily estimated by programmers in the art to which the present invention belongs.

As mentioned above, according to the present invention, it is possible to supply the shortage of the channels which can occur as the bandwidth increases. Namely, it is possible to prevent the incomplete use of the bandwidth due to the restriction of the number of channels by increasing the 64 channels to 256 channels.

What is claimed is:

1. A method for extending channels of the IEEE 1394 serial bus in a channel assignment through an isochronous resource manager (IRM) of an IEEE 1394 node, wherein the IEEE 1394 node comprises a CP register for physical channels and a CE register for extended channels which have the same format as the format of a CA register which holds information on channels assigned by the IRM, comprising:

checking whether all the channels of the IRM are used and there is available bandwidth;

setting a CE register value, which is a value obtained by adding 64 to a CP value of the CP register, to the CE register when all the channels are used and there is available bandwidth; and generating a packet by setting a tag field value of a packet as a predetermined value when the CE register value is set to the CE register.

2. The method of claim 1, further comprising:

if the CE register value set in the setting step does not correspond to an available extended channel, providing further extended channels by setting the tag field value of the packet as another reserved value.

3. A method of canceling channels extended by a predetermined channel assignment through an IRM of an IEEE 1394 node, wherein the node comprises a CP register for physical channels and a CE register for extended channels which have the same format as the format of a CA register which shows information on channels assigned by the IRM, comprising:

checking whether a channel number to be canceled corresponds to an extended channel;

setting the corresponding bit of the CE register to be not in use when the channel number corresponds to the extended channel;

checking whether the corresponding bit of the CP register is indicated to be in use; and canceling the corresponding channel of the IRM when the corresponding bit of the CP register is indicated to be not in use.

4. The method of claim 3, further comprising:

checking whether the corresponding bit of the CE register is indicated to be in use when the channel number to be canceled does not correspond to an extended channel;

setting only the corresponding bit of the CP register to be not in use when the corresponding bit of the CE register is indicated to be in use; and canceling the corresponding channel of the IRM when the corresponding bit of the CE register is indicated to be not in use.

* * * * *